Dec. 18, 1923.  W. KRAUSE  1,478,234
IRRIGATION SYSTEM
Filed May 21, 1920
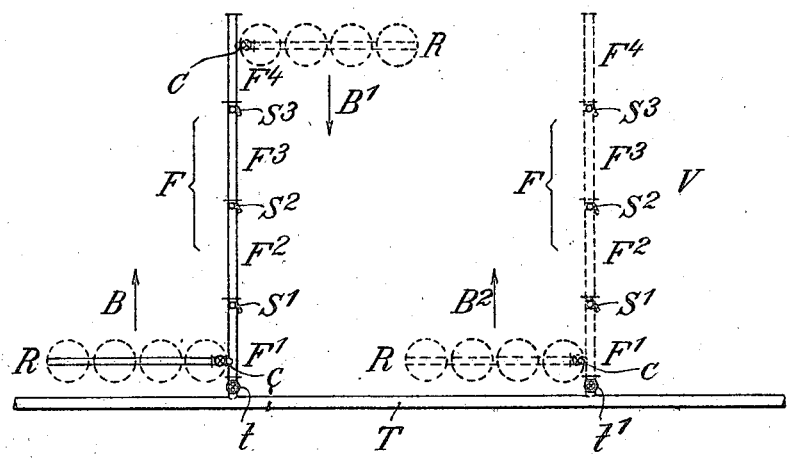
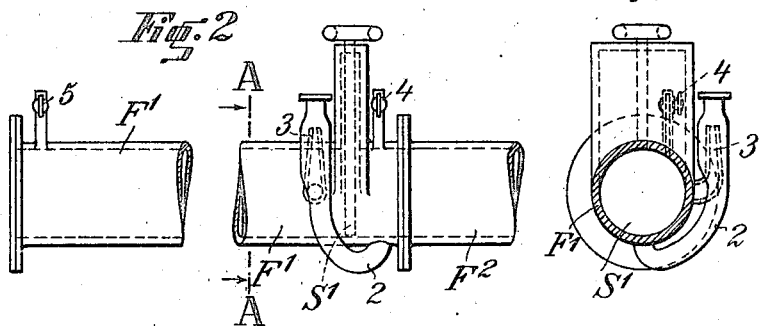
Witnesses:
Daniel Mathé
Leon H Kohlmann
Inventor:
Walter Krause
by John Lotka
Attorney Patented Dec. 18, 1923.

1,478,234

UNITED STATES PATENT OFFICE.

WALTER KRAUSE, OF FRIESACK, GERMANY.

IRRIGATION SYSTEM.

Application filed May 21, 1920. Serial No. 383,326.

*To all whom it may concern:*

Be it known that I, WALTER KRAUSE, a citizen of Germany, and resident of Friesack, Mark, Germany, have invented certain new and useful Improvements in Irrigation Systems, for which I have filed applications in Germany, March 4, 1918, patent not yet issued; Austria, January 29, 1919, Patent No. 85,056, issued August 10, 1921; Hungary, February 1, 1919, patent not yet issued; France, February 11, 1919, Patent No. 517,861, issued December 22, 1920; Spain, February 22, 1919, Patent No. 69,124, issued August 23, 1920; Denmark, February 4, 1919, Patent No. 26,536, issued August 18, 1920; Belgium, February 25, 1919, Patent No. 279,067, issued April 30, 1919; Holland, March 1, 1919, patent not yet issued; Italy, February 25, 1919, Patent No. 542/99; Sweden, January 31, 1919, patent not yet issued; Luxemburg, October 29, 1919, Patent No. 11,541, issued October 29, 1919; Canada, May 26, 1920, patent not yet issued; Finland, October 30, 1919, Patent No. 8,114, issued August 13, 1920; Great Britain, January 27, 1920, Patent No. 138,345, and of which the following is a specification.

My invention relates to improvements in irrigation systems. More particularly my invention relates to systems of that type in which the water is supplied from a main supply conduit to a field conduit adapted successively to be connected to different outlets of the supply conduit, and from the field conduit to a sprinkling conduit adapted successively to be connected to different outlets of the field conduit. The object of the improvements is to provide a system of this class and a method of operating the same in which the loss of time caused by shifting the field and sprinkling conduits from one point of use to another is reduced. With this and other objects in view my invention consists in the matters to be described hereinafter and particularly pointed out in the appended claims. For the purpose of describing the invention an example embodying the same has been shown in the accompanying drawing, in which the same letters of reference have been used in all the views to indicate corresponding parts. In said drawing,—

Fig. 1, is a diagrammatical plan view illustrating my improved system,

Fig. 2, is a detail view showing one of the sections of the field conduit, and

Fig. 3, is a vertical cross-section taken on the line A—A of Fig. 2.

As shown in Fig. 1, the system consists of a main supply conduit T having a plurality of normally closed outlets $t$, $t^1$, etc., a field conduit F constructed in sections $F^1$, $F^2$, $F^3$, $F^4$ ... and adapted to be successively connected to the outlets $t$, $t^1$, ... of the main conduit, and a sprinkling conduit R adapted to be successively connected to different outlets of the field conduit. In the operation of the system the sprinkling conduit R is alternately moved away from the main conduit and towards the same, as is indicated by the arrows B, $B^1$, $B^2$, and when it arrives at the outlet of the field conduit which is next to the main conduit the field conduit is closed as against the main conduit, whereupon the field conduit and the sprinkling conduit are taken apart and moved to the next outlet of the main conduit. This operation takes much time which is lost for the sprinkling operation, the length of the field conduit being as much as 1500 feet, and the distance between successive outlets $t$ of the main conduit being as much as 1200 feet. In order to reduce the loss of time I provide the field conduit with valves $S^1$, $S^2$, $S^3$, etc., and when moving the sprinkling conduit towards the main conduit I close the sections of the field conduit located behind the sprinkling conduit, and I dismount the said sections and transport the same to the points of the next operation while sprinkling is continued. Therefore, when the sprinkling conduit is connected to the valved outlet C of the section $F^1$ which is next to the main conduit T most of the sections of the field conduit have already been carried to the position V indicated in dotted lines and assembled in such position, so that only the last section $F^1$ of the field conduit and the sprinkling conduit R require to be carried into the position V and connected to the outlet from the main conduit and the section $F^2$ of the field conduit while the sprinkling operation is interrupted.

In order that the water left within the closed sections of the field conduit may not flow out at one part of the field, which would excessively moisten the soil and actually result in a waste of the water, I prefer to provide means for withdrawing the water from the said sections of the field conduit prior to dismounting the same. In Figs.

2 and 3 I have shown preferred means to withdraw the water. As shown in the said figures, near the end of the section $F^1$ a slide valve $S^1$, two branch pipes 2 and 3, and an air cock 4 are located. The branch pipe 2 is connected to the bottom part of the section $F^1$ and at the rear of the slide valve $S^1$ as seen from the main conduit, and it surrounds the pipe 3 which is connected to a suitable part of the section $F^1$ and in front of the valve $S^1$, said pipe 3 being in the form of a nozzle. The cock 4 is provided at the upper part of the section $F^1$ and at the rear of the valve $S^1$. Now, if the valve $S^1$ is closed and the cock 4 opened while the section $F^1$ is under pressure, the water left within the section $F^1$ at the rear of valve $S^1$ and within the section $F^2$ is withdrawn through the pipe 2, the nozzle 3 acting as an ejector, and the said water can either directly be sprinkled by suitable means provided on the free end of the pipe 2, or be supplied to the sprinkling conduit.

As in some cases the section $F^1$ may be inclined I prefer to provide a second air cock 5 at the opposite end of the section $F^1$.

It will be understood that instead of the suction apparatus shown in the figures other suitable means may be provided for distributing the water from the sections over the field.

I claim:

1. An irrigation system comprising a main supply conduit having a plurality of closed outlets disposed suitable distances apart, a field conduit adapted to be successively connected to the outlets of said main supply conduit and composed of sections connected by joints, normally closed outlets in said field conduit, valves in said field conduit, means operated by the pressure water within the sections of the field conduit connected with the main supply conduit to withdraw water from the sections of the field conduit which have been separated by the valves from the main supply conduit, and a sprinkling member adapted to be connected to the outlets of said field conduit.

2. An irrigation system comprising a main supply conduit having a plurality of normally closed outlets disposed suitable distances apart, a field conduit adapted to be successively connected to the outlets of said main supply conduit and composed of sections connected by joints, normally closed outlets in said field conduit, valves in said field conduit, discharge pipes connected with the field conduit each at the sides of the valves away from the main supply conduit, nozzles connected with the field conduit at points between the valves and the main supply conduit and arranged for cooperation with the discharge pipes to withdraw water from the sections of the field conduit which have been separated by the valves from the main supply conduit, and a sprinkling member adapted to be connected to the outlets of said field conduit.

3. An irrigation system comprising a main supply conduit having an outlet, a field conduit connected with said supply conduit and composed of sections connected by joints, and having normally closed outlets, valves in said field conduit, means operated by the pressure of the water in those sections of the field conduit which are connected with said supply conduit, to withdraw water from the scetions of said field conduit which have been cut off from the main conduit by said valves, and a sprinkling member adapted to be connected to any one of the outlets of said field conduit.

4. An irrigation system comprising a main supply conduit having an outlet, a field conduit adapted for connection with said outlet, and composed of sections connected by joints, normally closed outlets in said field conduit, valves in said field conduit, discharge pipes connected with the field conduit at points thereof exteriorly of the respective valves, nozzles connected with the field conduit at points between the valves and the supply conduit, and arranged for co-operation with the discharge pipes to withdraw water from the sections of the field conduit which have been cut off from the main supply conduit by said valves, and a sprinkling member adapted to be connected with any one of the outlets of said field conduit.

In testimony whereof I hereunto affix my signature in the presence of two witnesses.

WALTER KRAUSE.

Witnesses:
 GRETE GUTZEIT,
 GERTRUD FAHNRICH.